United States Patent
Michelis et al.

(10) Patent No.: US 10,293,852 B2
(45) Date of Patent: May 21, 2019

(54) UNDERSTEER AND OVERSTEER DETECTOR FOR A MOTOR VEHICLE

(71) Applicant: JTEKT EUROPE, Irigny (FR)

(72) Inventors: André Michelis, Chonas l'Amballan (FR); Christophe Ravier, Saint Pierre de Chandieu (FR); Pascal Moulaire, La Tour de Salvagny (FR)

(73) Assignee: JTEKT EUROPE, Irigny (FR)

( * ) Notice: Subject to any disclaimer, the term of this patent is extended or adjusted under 35 U.S.C. 154(b) by 34 days.

(21) Appl. No.: 15/531,138

(22) PCT Filed: Nov. 16, 2015

(86) PCT No.: PCT/FR2015/053086
§ 371 (c)(1),
(2) Date: May 26, 2017

(87) PCT Pub. No.: WO2016/083702
PCT Pub. Date: Jun. 2, 2016

(65) Prior Publication Data
US 2017/0320517 A1   Nov. 9, 2017

Related U.S. Application Data

(63) Continuation of application No. PCT/FR2015/053086, filed on Nov. 16, 2015.

(30) Foreign Application Priority Data

Nov. 26, 2014   (FR) ..................................... 14 61464

(51) Int. Cl.
*B60W 30/00*   (2006.01)
*B60W 30/02*   (2012.01)
(Continued)

(52) U.S. Cl.
CPC ............. *B62D 6/003* (2013.01); *B60W 30/02* (2013.01); *B60W 40/00* (2013.01); *B60W 40/068* (2013.01)

(58) Field of Classification Search
CPC ...... B60W 30/00; B60W 30/02; B60W 40/00; B60W 40/068; B62D 6/00; B62D 6/003; B62D 6/006
See application file for complete search history.

(56) References Cited

U.S. PATENT DOCUMENTS

| | | | |
|---|---|---|---|
| 4,809,181 A * | 2/1989 | Ito ........................ | B60T 8/1755 303/146 |
| 6,604,036 B2 * | 8/2003 | Pallot .................... | B60T 8/1755 701/48 |

(Continued)

FOREIGN PATENT DOCUMENTS

| DE | 102010007615 A1 | 9/2010 |
|---|---|---|
| DE | 102010030173 A1 | 12/2011 |
| WO | 2004/005093 A1 | 1/2004 |

OTHER PUBLICATIONS

Jan. 27, 2016 International Search Report issued in Patent Application No. PCT/FR2015/053086.

(Continued)

*Primary Examiner* — Yonel Beaulieu
(74) *Attorney, Agent, or Firm* — Oliff PLC

(57) ABSTRACT

A method for detecting a situation of loss of grip of a vehicle provided with a steering system operated by a steering wheel, the method including a step (a) of evaluating a first indicator of loss of grip (P1) by calculating, as the first indicator of loss of grip (P1), the partial derivative $$\left(P1 = \frac{\partial \psi}{\partial \alpha}\right),$$

(Continued)

relative to a variable ($\alpha$) representative of the angular position of the steering wheel, of a driving parameter which is representative of the yaw rate ($\dot{\psi}$) of the vehicle.

9 Claims, 2 Drawing Sheets

(51) Int. Cl.
  *B60W 40/00* (2006.01)
  *B62D 6/00* (2006.01)
  *B60W 40/068* (2012.01)

(56) References Cited

U.S. PATENT DOCUMENTS

| | | | |
|---|---|---|---|
| 6,931,313 B2* | 8/2005 | Kato | B60T 8/172 |
| | | | 180/443 |
| 2002/0035871 A1* | 3/2002 | Pallot | B60T 8/1755 |
| | | | 73/489 |
| 2003/0093207 A1* | 5/2003 | Pallot | B60T 8/17555 |
| | | | 701/70 |
| 2005/0071061 A1* | 3/2005 | Kato | B60T 8/172 |
| | | | 701/41 |

OTHER PUBLICATIONS

Jan. 27, 2016 Written Opinion of the International Searching Authority issued in Patent Application No. PCT/FR2015/053086.

* cited by examiner

UNDERSTEER AND OVERSTEER DETECTOR FOR A MOTOR VEHICLE

The present invention relates to the general field of the analysis and management of the dynamic behavior of a vehicle, such as a motor vehicle.

The present invention concerns more particularly a method for detecting situations of loss of grip capable of identifying an understeer or oversteer situation (that is to say a situation of loss of grip in which a loss of grip of the front axle of the vehicle results in an understeer, and/or respectively a situation of loss of grip in which a loss of grip of the rear axle of the vehicle results in an oversteer).

It is known to monitor the behavior of a vehicle in order to be able to detect the occurrence of a situation of loss of grip, for example so as to allow the power steering system which equips the vehicle to automatically intervene in order to correct an understeering behavior of the vehicle, which allows improving the road holding of the vehicle when turning and consequently the safety of the occupants of said vehicle and the safety of the other road users.

However, the implementation of such monitoring is sometimes complex, insofar as it is generally necessary to add sensors to the vehicle which are specifically dedicated to collecting useful dynamic information, which increases the cost, the overall dimension and the weight of the device ensuring the monitoring of the behavior of the vehicle.

Furthermore, the monitoring process makes generally use of calculations which can be relatively long and complex, which in some cases, can affect the reactivity or the reliability of said monitoring process.

The objects assigned to the invention aim consequently to overcome the aforementioned disadvantages and to propose a new method for detecting a situation of loss of grip of a vehicle which is simple and inexpensive to implement, while allowing an accurate, fast and reliable diagnosis of the behavior of the vehicle.

The objects assigned to the invention are achieved by means of a method for detecting a situation of loss of grip of a vehicle provided with a steering system operated by a steering wheel, said method being characterized in that it comprises a step (a) of evaluating a first indicator of loss of grip comprising calculating, as first indicator of loss of grip, the partial derivative, relative to a variable representative of the angular position of the steering wheel, of a driving parameter which is representative of the yaw rate of the vehicle.

In other words, the invention advantageously proposes to use the partial derivative of the yaw rate of the vehicle relative to the angular position of the steering wheel (or <<steering wheel angle>>), that is to say the ratio between the elementary variation of the yaw rate in a short period of time and the corresponding elementary variation of the angular position of the steering wheel, considered in the same period of time, as an indicator of the behavior of the vehicle (in terms of grip to the road), and more particularly as a means of characterizing, and therefore of detecting, the occurrence of an understeering or oversteering behavior, characteristic of a loss of grip.

Advantageously, the inventors found indeed that there was a correlation between the angular (actual) position of the steering wheel, the yaw rate, and the situation of grip, and that it was possible to graphically express and distinguish the situations of grip and loss of grip of a vehicle, in the form of fields which occupy distinct areas within the same reference frame representing the yaw rate (as the ordinate) as a function of the angular position of the steering wheel (as the abscissae).

The boundaries of these graphic fields, which characterize the limits to which the changes in the situation of grip of the vehicle take place, and more particularly which characterize the conditions of occurrence of an understeering or oversteering behavior, follow outlines (typically straight lines) which can be advantageously characterized by their tangents, tangents which correspond in this case to the value of the partial derivative of the yaw rate relative to the angular position of the steering wheel, at the point considered in the aforementioned reference frame.

The calculation and study of a (first) indicator formed by such a partial derivative therefore allows to reliably establish the field in which the vehicle is located at a given instant, which provides information on the situation of grip of said vehicle.

In a particularly advantageous manner, the analysis proposed by the invention, namely the evaluation of a situation of grip from the partial derivative of the yaw rate relative to the angular position of the steering wheel, allows in practice to early detect a situation of loss of grip, and more particularly to identify, in advance, the occurrence of predictive and transitional conditions which precede a significant loss of grip.

The method therefore allows, where appropriate, to decide automatically and particularly early, while the vehicle is still controllable, of an appropriate reaction, intended to allow the vehicle to recover the grip or, more simply, intended to prevent said vehicle from losing grip (or, possibly, losing more grip), and to automatically apply this reaction to the power steering device, while the vehicle is still controllable, either to directly and automatically correct the configuration of the steering device in order to regain grip or to warn, preferably tactically, the driver in order to encourage said driver to correct himself the path of the vehicle to avoid, stop or remedy a loss of grip.

The safety of the occupants of the vehicle is therefore enhanced.

Furthermore, the speed of execution and the reliability of the method are reinforced by the fact that the calculation and the analysis of the first indicator (that is to say the partial derivative) involve simple mathematical expressions, as well as data (yaw rate, steering wheel angle) which are directly available or easily determinable within any power steering device.

The method according to the invention can therefore be implemented simply, effectively, and at a lower cost.

Other objects, characteristics and advantages of the invention will appear in more detail upon reading the following description, as well as with reference to the appended drawings, provided only for an illustrative and non-restrictive purpose, among which:

Figure 1:
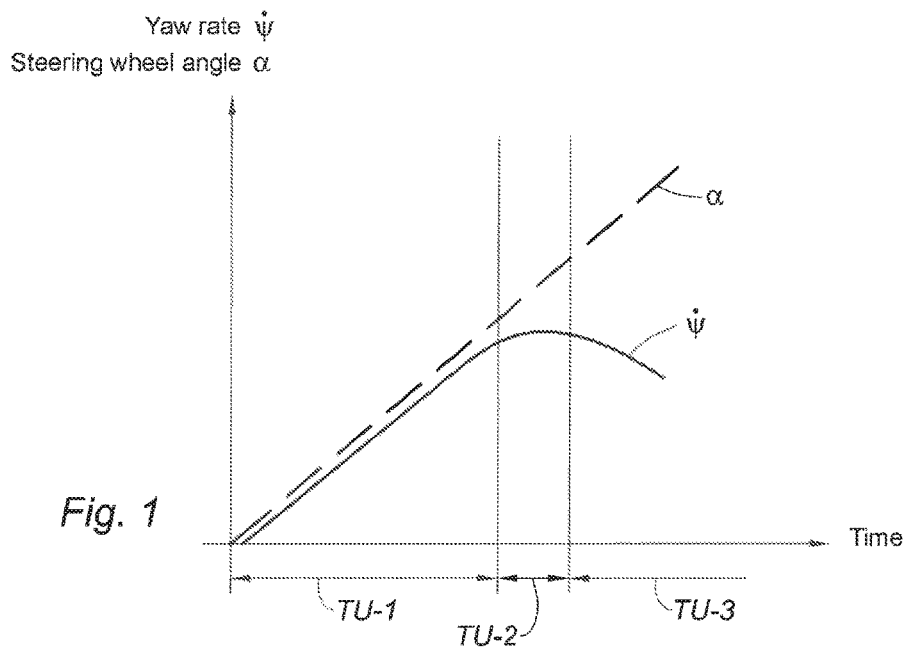
FIG. 1 illustrates, schematically, the time evolution of the angular position of the steering wheel and of the yaw rate during the occurrence and the course of an understeer situation.

The present invention concerns a method for detecting a situation of loss of grip of a vehicle, vehicle which is provided with a steering system, and more preferably a power steering system, operated by a steering wheel.

More particularly, the invention concerns a method for detecting a situation of loss of grip during turning (or more generally during a steering maneuver of the steering system), that is to say typically a method for detecting an understeer situation or an oversteer situation.

Of course, the invention also concerns an estimation device, of the kind electronic circuit, electronic board, calculator (computer), programmable logic controller, or any other equivalent device, intended to implement such a method.

It should be noted that such an estimation device can present a physical control structure, defined by the wiring of its electronic components, and/or, preferably, a virtual control structure, defined by a suitable computer programming.

In a manner known per se, the power steering system can comprise a steering wheel mounted on a steering column and which allows the driver to change the steering angle (that is to say the yaw orientation) of the steered wheels of the vehicle (which are moreover preferably drive wheels), by means of a steering mechanism preferably comprising a steering rack, which is slidably mounted (preferably along a lateral direction transverse to the vehicle) in a steering housing (itself secured to the frame of the vehicle) and which actuates steering tie rods linked to stub axles carrying said steered wheels. The steering column will preferably mesh on the rack by means of a drive pinion.

The power steering system will also comprise an assist motor, preferably an electric assist motor, arranged to exert an operating force, and more particularly an operating torque, on the steering mechanism, where appropriate by means of a reducer of the kind worm wheel and worm screw reducer, wherein said operating force o operating torque is determined according to predefined assistance laws.

The assist motor (and where appropriate its reducer) can in particular be arranged to be engaged on the steering column itself, so as to preferably form a mechanism called <<single-pinion>> mechanism, or on the steering rack, separately from the steering column, to preferably form then a mechanism called <<dual-pinion>> mechanism.

According to the invention, the method comprises a step (a) of evaluating a first indicator of loss of grip P1 comprising calculating, as the first indicator of loss of grip P1, the partial derivative, relative to a variable α representative of the angular position of the steering wheel, of a driving parameter which is representative of the yaw rate $\dot\psi$ of the vehicle:

$$P1 = \frac{\partial \dot\psi}{\partial \alpha},$$

The variable α representative of the angular position of the steering wheel, or <<steering wheel angle>>, can be chosen from any variable which is in practice representative of (and more particularly proportional to, or even equal to) the (instantaneous) steering angle of the steering mechanism, and therefore representative of (and more particularly proportional to, or even equal to) the (instantaneous) angular position of the steering wheel.

In practice, and in what follows, said variable α will therefore be preferably assimilated to the angular position of the steering wheel.

Said variable α can be provided by any appropriate means allowing determining the (actual) absolute position of the steering mechanism, and more particularly the absolute angular position of the steering wheel or, in an equivalent manner, the absolute angular position of the shaft of the assist motor or the absolute position of the rack.

It will thus be possible to consider measuring the angular position α by means of a position sensor which can be placed, for example, at the steering wheel, at the steering column, or at the steering rack.

According to another preferential possibility, the angular position of the steering wheel α will be obtained from a measurement of the angular position of the shaft of the assist motor, measurement which can be carried out, for example, by means of a <<resolver>> type sensor, preferably integrated to said assist motor.

According to this other possibility, it is possible, for example, to apply a determination function of the <<dangle finding>> type, such as the one described in the patent application FR-2 992 937 filed by the applicant, and according to which is added to the measurement of the relative multi-turn position of the shaft of the assist motor, a corrective term (offset), which is obtained by a weighted average of the successively observed deviations between, on the one hand, said relative position measurement and, on the other hand, an estimation of the absolute position of the steering wheel, which is obtained by a study of the dynamic behavior of the vehicle.

Moreover, it is possible to determine and use as a driving parameter representative of the (instantaneous) yaw rate $\dot\psi$ of the vehicle any quantity which is representative of, and more particularly proportional to, or even equal to, the (instantaneous) yaw rate of the vehicle, and whose evolution is comparable, and preferably identical, to the evolution of said yaw rate $\dot\psi$.

For convenience, it is consequently possible, unless otherwise stated, to assimilate the driving parameter to the yaw rate $\dot\psi$ in what follows.

Thus, according to a preferential implementation possibility, the driving parameter, whose partial derivative is calculated, will be a measurement or an estimation of the yaw rate $\dot\psi$ of the vehicle at a given instant, which can for example be provided by an electronic path stabilization system, of the <<ESP>> type.

The first indicator will then be written, stricto sensu:

$$P1 = \frac{\partial \dot\psi}{\partial \alpha}.$$

According to another possibility, said driving parameter, whose partial derivative is calculated, can be the theoretical angular position of the steering wheel (or <<theoretical steering wheel angle>>), $\alpha_{theoretical}$ obtained from the angle of Ackermann $\alpha_{Ackermann}$, that is to say the angular position of the steering wheel (and therefore of the wheels) which would correspond, in the absence of drift, to the dynamic behavior of the vehicle which is observed at the given instant.

More particularly, according to this other possibility, we will have:

$$\dot{\psi} = \frac{V}{R}$$

with

V the (longitudinal) speed of the vehicle,

R the instantaneous radius of curvature of the path of the vehicle.

The angle of Ackermann (that is to say the yaw angle of the wheel, considered without drift of the tire) is written:

$$\alpha_{Ackermann} = \frac{L}{R}$$

wherein L represents the wheelbase of the vehicle.

The corresponding theoretical angle of the steering wheel is then:

$$\alpha_{theoretical} = D \times \alpha_{Ackermann} = D \times \frac{L}{R}$$

with D the kinematic scaling factor of the kinematic chain which links the steering wheel to the wheels (herein typically via the steering column and the rack on which said steering column meshes).

In the end, we therefore obtain:

$$\alpha_{theoretical} = \frac{\dot{\psi} \times D \times L}{V}$$

Since the theoretical steering wheel angle $\alpha_{theoretical}$ is here proportional to the yaw rate $\dot{\psi}$, the evolution of said theoretical steering wheel angle, in particular with regard to the evolution of the (actual) angular position $\alpha$ of the steering wheel, can provide information on the evolution of said yaw rate $\dot{\psi}$ with regard to the (actual) angular position $\alpha$ of the steering wheel.

In this way, the corresponding partial derivative $$\frac{\partial \alpha_{theoretical}}{\partial \alpha},$$

and therefore the first indicator P1 calculated from said theoretical angular position $\alpha_{theoretical}$, can be used, within the scope of the invention, as substantially equivalent to the partial derivative and to the first indicator P1 that is obtained, stricto sensu, from the yaw rate $\dot{\psi}$.

In other words, it can be considered that:

$$P1 = \frac{\partial \dot{\psi}}{\partial \alpha} \approx \frac{\partial \alpha_{theoretical}}{\partial \alpha}.$$

Advantageously, acquiring the (instantaneous) angular position of the steering wheel $\alpha$, and of the (instantaneous) driving parameter $\dot{\psi}$, $\alpha_{theoretical}$, as well as refreshing the calculation of the first indicator of loss of grip P1, can be performed substantially in real time, for example according to a sampling period (refreshment period) $T_{samp}$ substantially comprised between 1 ms and 100 ms (which will correspond to a refreshment frequency comprised between 10 Hz and 1 kHz, or even more).

In practice, the partial derivative can be calculated by performing the quotient, on the one hand, of the elementary variation of the driving parameter $\dot{\psi}$ between two close successive instants t1 and t2 (preferably separated by a duration which corresponds to the sampling period $T_{samp}$) and, on the other hand, of the corresponding elementary variation of the angular position of the steering wheel $\alpha$ between these two same instants t1 and t2:

$$P1 = \frac{\partial \dot{\psi}}{\partial \alpha} = \frac{\dot{\psi}(t2) - \dot{\psi}(t1)}{\alpha(t2) - \alpha(t1)},$$

with preferably t2−t1=$T_{samp}$.

Figure 4:
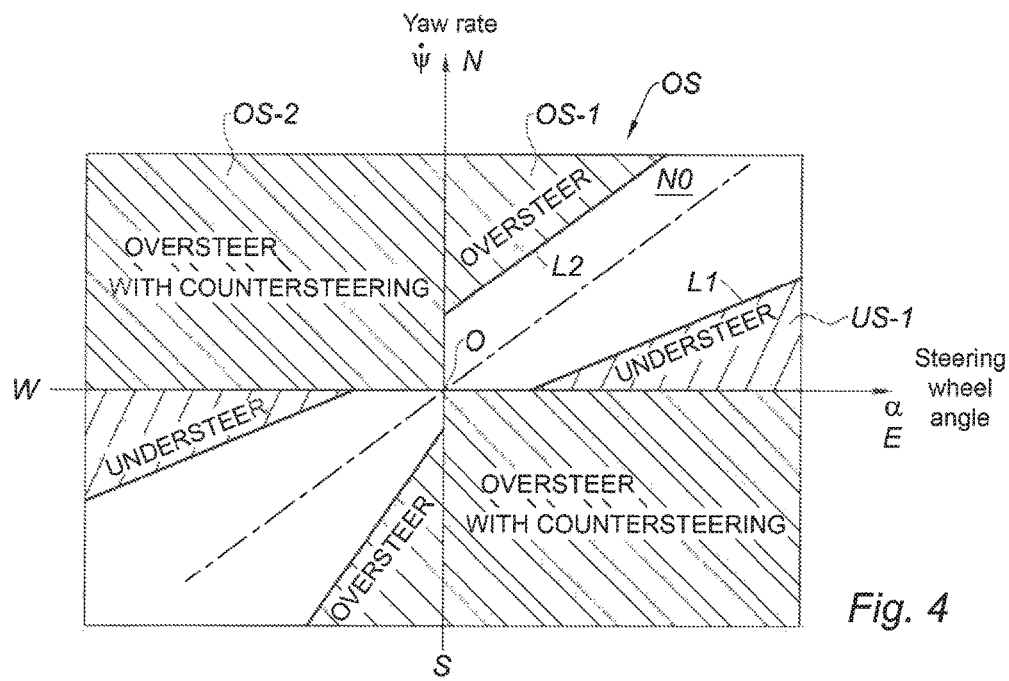
FIG. 4 illustrates, within a four-quadrant reference frame representing the yaw rate (as the ordinate) as a function of the angular position of the steering wheel (as the abscissae), the fields associated with the different situations of grip of a vehicle, and more particularly the different oversteer and understeer situations.

In a particularly advantageous way, calculating a first indicator P1 corresponding to the partial derivative of the driving parameter representative of the yaw rate $\dot{\psi}$ by the angular position of the steering wheel $\alpha$ makes it possible to define a very simple identification criterion of the oversteer and understeer situations, which will be better understood by referring to the graph of FIG. 4.

Said FIG. 4 represents a four-quadrant reference frame, whose abscissa axis corresponds to the angular position of the steering wheel («steering wheel angle») $\alpha$, and whose ordinate axis corresponds to the yaw rate $\dot{\psi}$ of the vehicle.

For convenience of description, cardinal points will be associated with this reference frame and therefore with the quadrants, the South-North axis corresponding to the ordinate axis (traversed in the direction of the increasing yaw rates), and the West-East axis corresponding to the abscissa axis (traversed in the direction of the increasing steering wheel angles).

In this reference frame, the different situations of grip of the vehicle appear in the form of fields which occupy distinct (non-overlapping, but adjoining) areas.

More particularly, there will be distinguished:
a normal grip field, noted N0, which corresponds to a situation in which the vehicle responds in a normal and predictable manner to the steering operation, by engaging in the corresponding turn without loss of grip;
an understeer field, noted US-1 (for «UnderSteering-1»), which corresponds graphically to the lower East-North-East triangle located in the North-East quadrant;
an oversteer field, noted OS (for «OverSteering»), which comprises two sub-fields, namely, on the one hand, a first oversteer sub-field with "reducing the steering", noted OS-1, which corresponds to an oversteer situation in which the driver operates the steering wheel in the direction of the central position thereof (corresponding to the straight line) so as to reduce the steering wheel angle $\alpha$ and recover the grip, and which corresponds graphically to the upper North-North-East triangle and, on the other hand, a second oversteer sub-field with countersteering, noted OS-2, which corresponds to a steering situation with countersteering, in which the driver actuates the steering wheel so as to orient the wheels in the direction opposite to the turn (that is to say in which the driver reverses the sign of the steering wheel angle), and which corresponds graphically to the rectangle of the North-West quadrant.

It should be noted that the graph has a substantially symmetrical appearance (relative to its origin O), insofar as each field associated with a right turn situation has a homologous field corresponding to a left turn situation.

The boundaries L1, L2 (also called <<dividing lines>>) of these graphic fields characterize the limits to which the changes in the situation of grip of the vehicle take place, and more particularly characterize the conditions of occurrence of an understeering or oversteering behavior.

Thus, by detecting whether one is approaching, reaching and/or crossing one of these boundaries, it is possible to determine the imminence, or the effective occurrence of a situation of loss of grip.

Furthermore, the proposed method advantageously allows diagnosing the nature of the situation of loss of grip, that is to say, qualifying precisely the type of loss of grip, in particular by distinguishing between understeer and oversteer, and where appropriate between simple oversteer, with maintaining or accentuating the steering, oversteer with <<reducing the steering>>, and oversteer with countersteering, as will be detailed hereinafter.

In this case, the dividing lines L1, L2 of the aforementioned fields follow outlines, herein typically straight lines, which can advantageously be characterized by their tangents, said tangents being herein typically representative of the slopes of said straight lines.

Now, in fact, the orientation of said tangents, that is to say the slope of the straight lines marking the dividing lines L1, L2, corresponds in this case to the value of the partial derivative of the yaw rate relative to the angular position of the steering wheel, that is to say the value taken, at the given instant, by the first indicator P1, at the point considered in the aforementioned reference frame.

Said first indicator P1 can therefore, in particular, constitute an (instantaneous) indicator, or <<estimator>>, of understeer and/or oversteer.

Preferably, the method comprises an understeer diagnosis step (b) during which the value of the first indicator of loss of grip P1 is compared with a predetermined understeer threshold Threshold_US, and an understeer situation (which can be a situation predictive of an understeer, corresponding to the existence of an imminent risk of understeer, or an effective understeer situation) is concluded if the value of said first indicator P1 is less than said understeer threshold Threshold_US.

In other words, it is possible to set as an understeer condition, that is to say as a condition which must be necessarily verified so that it can be deduced that one is in an understeer situation:

$$P1 = \frac{\partial \dot{\psi}}{\partial \alpha} < \text{Threshold\_US}.$$

Graphically, said understeer threshold Threshold_US will correspond to the slope of the first dividing line L1 (herein located in the N-E quadrant) which separates the normal field N0 from the understeer field US-1.

In this case, said first dividing line L1 is secant to the positive portion of the abscissa axis, and represents an increasing affine function in the N-E quadrant, so that the understeer field US-1 corresponds to the triangular area which is located under said normal field N0, and more particularly to the area which is comprised between the abscissa axis and said first dividing line L1.

It should be noted that, if the first indicator P1 is calculated from the theoretical steering wheel angle $\alpha_{theoretical}$, rather than calculating said first indicator P1 directly from the yaw rate $\dot{\psi}$ stricto sensu, an understeer condition can be set in an equivalent manner in the form:

$$P1 = \frac{\partial \alpha_{theoretical}}{\partial \alpha} < \text{Threshold\_US'},$$

where Threshold_US' corresponds to the understeer threshold.

It should be noted that the understeer threshold(s) Threshold_US and Threshold_US', associated with the yaw rate $\dot{\psi}$, and respectively with the theoretical steering wheel angle $\alpha_{theoretical}$, can preferably be dynamically adjusted, substantially in real time, as a function of the speed of the vehicle.

More generally, the mapping of the fields corresponding to the different situations of grip of the vehicle, as represented in FIG. 4, can thus be evolutionary, and the outline thereof (in this case the outline of the boundaries L1, L2 between said fields) can be modified as a function of the (linear) speed of the vehicle.

Still in the context of improving the accuracy and reliability of the method according to the invention, the understeer threshold(s) Threshold_US and Threshold_US', associated with the yaw rate $\dot{\psi}$ and respectively with the theoretical steering wheel angle $\alpha_{theoretical}$, can preferably be adjusted, possibly in addition to their adjustment as a function of the speed of the vehicle, as a function of the steering wheel torque which is exerted by the driver on the steering wheel, in order to take into account the offset effects between the angular position of the steering wheel and the actual angular position of the rest of the steering mechanism, and more particularly between the angle of the steering wheel and the steering angle of the wheels, wherein said offset effects are induced by the elastic deformation of the steering mechanism and more particularly by the elastic torsional deformation of the torsion bar which is placed between the steering wheel and the steering column in order to measure the steering wheel torque.

In other words, the understeer threshold Threshold_US, Threshold_US' can in particular take account the stiffness (ratio between experienced force and corresponding deformation) of the steering mechanism, and more particularly the stiffness of the torsion bar of the steering wheel torque sensor.

Moreover, it should be noted that, in order to arrive at a conclusion of the effective occurrence of an understeer situation, it will also be possible to take into consideration, in addition to the comparison criterion of the partial derivative P1 with the understeer threshold Threshold_US, Threshold_US', one or more other complementary criterion/criteria, such as, for example, the value at the given instant of an understeer rate that is representative of the deviation that exists between, on the one hand, the actual angular position of the steering wheel and, on the other hand, the theoretical angular position of the steering wheel, as said theoretical angular position of the steering wheel should correspond to the dynamic situation of the vehicle (for example with regard to the measured speed of the wheels of said vehicle).

Such an understeer rate can for example be calculated in the manner described in the international application WO-2010/070229 filed by the applicant.

It should be noted that, temporally, the detection of understeer by the first indicator P1 advantageously allows to early detect an understeer situation, before the vehicle becomes hardly controllable—or even uncontrollable—due to a significant loss of grip of the front axle.

Indeed, with reference to FIG. 1, it is possible to schematically break up the course of an understeer situation into three successive periods, namely:

a first period TU-1 of normal behavior, where the yaw rate $\dot{\psi}$ increases substantially similar to the steering wheel angle α, which indicates that the vehicle responds to the steering movement (that is to say to the accentuation of the steering wheel angle) in engaging a turning move, then a second period TU-2 of understeer entry, during which the curve of the yaw rate $\dot{\psi}$ bends, which indicates that said yaw rate $\dot{\psi}$ no longer increases in proportion to the steering wheel angle α and that the vehicle therefore no longer responds to the steering maneuver as effectively as it previously does, which also results in a regression of the self-aligning torque which is exerted on the wheels, then finally a third period TU-3 of loss of grip during which the yaw rate $\dot{\psi}$ decreases, even as the steering wheel angle α continues to increase, which indicates a <<stall>> of the front axle of the vehicle, wherein the vehicle is less and less turning, despite the driver increases turning more and more.

Now, the crossing by the first indicator P1 (that is to say by the aforementioned partial derivative), of the understeer threshold Threshold_US occurs precisely at the moment of the second period TU-2, and more particularly at the beginning of said second period TU-2 of understeer entry, that is to say prior to any significant loss of grip, and while the vehicle is still controllable.

This coincidence therefore allows to detect very early the appearance of a risk of understeer.

Moreover, according to a preferred characteristic which can constitute a full-fledged invention, and which can in particular be implemented in an alternative or complementary manner to the understeer diagnostic step (b), the method according to the invention comprises an oversteer diagnosis step (c) during which the value of the first indicator of loss of grip P1 is compared with a first predetermined oversteer threshold Threshold_OS_1, and an oversteer situation (which can be a predictive oversteer situation, corresponding to the existence of an imminent risk of oversteer, or an effective oversteer situation) is concluded if the value of the first indicator P1 is greater than said first oversteer threshold Threshold_OS_1.

In other words, it is possible to set as an oversteer condition, that is to say as a condition which must be necessarily verified so that one can deduce that an oversteer situation takes place: P1>Threshold_OS_1

The first oversteer threshold Threshold_OS_1 can advantageously be fastened by a setting in factory or in workshop, during development tests of the steering system and/or of the vehicle.

Furthermore, in a manner similar to what has been described above with reference to the understeer threshold Threshold_US, the first oversteer threshold Threshold_OS_1 can preferably be dynamically adjusted, substantially in real time, as a function of the speed of the vehicle and/or as a function of the steering wheel torque exerted by the driver on the steering wheel.

Graphically, the oversteer threshold Threshold_OS_1 will correspond to the slope of the second dividing line L2 (here located in the N-E quadrant) which separates the normal field N0 from the oversteer field OS, and more particularly from the oversteer sub-field with <<reducing the steering>> OS-1, substantially opposite to the understeer field US-1 relative to the bisector of the reference frame (bisector which is represented in mixed line in FIG. 4).

For instance, said second dividing line L2 is secant to the positive portion of the ordinate axis and represents an increasing affine function in the N-E quadrant, so that the oversteer field OS, and more particularly the oversteer sub-field with <<reducing the steering>> OS-1, corresponds to the triangular area which is located above said normal field N0, and more particularly to the area which is comprised between the ordinate axis and said second dividing line L2.

Here again, as well as for the detection of an understeer, the use of the first indicator P1 with a partial (non-temporal) derivative advantageously allows an early detection of an oversteer situation.

Figure 2:
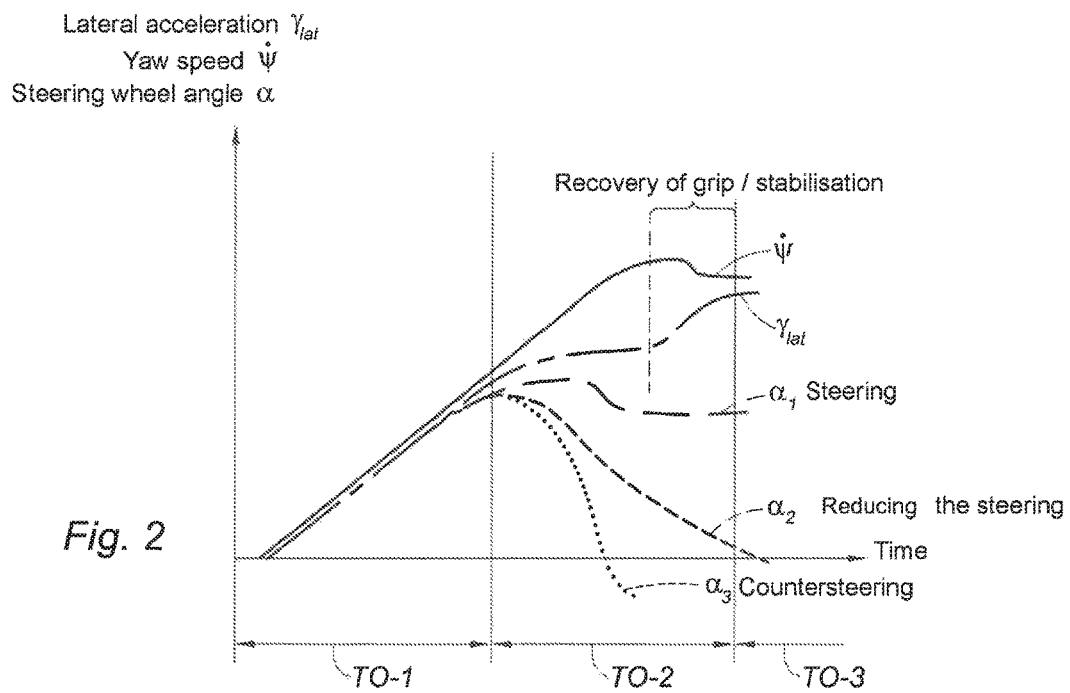
FIG. 2 illustrates, schematically, the time evolution of the angular position of the steering wheel, of the yaw rate and of the lateral acceleration of the vehicle in an oversteer situation, by distinguishing several scenarios according to whether the driver accentuates the steering, returns the steering wheel to its central position, or countersteers to recover the grip.
Figure 3:
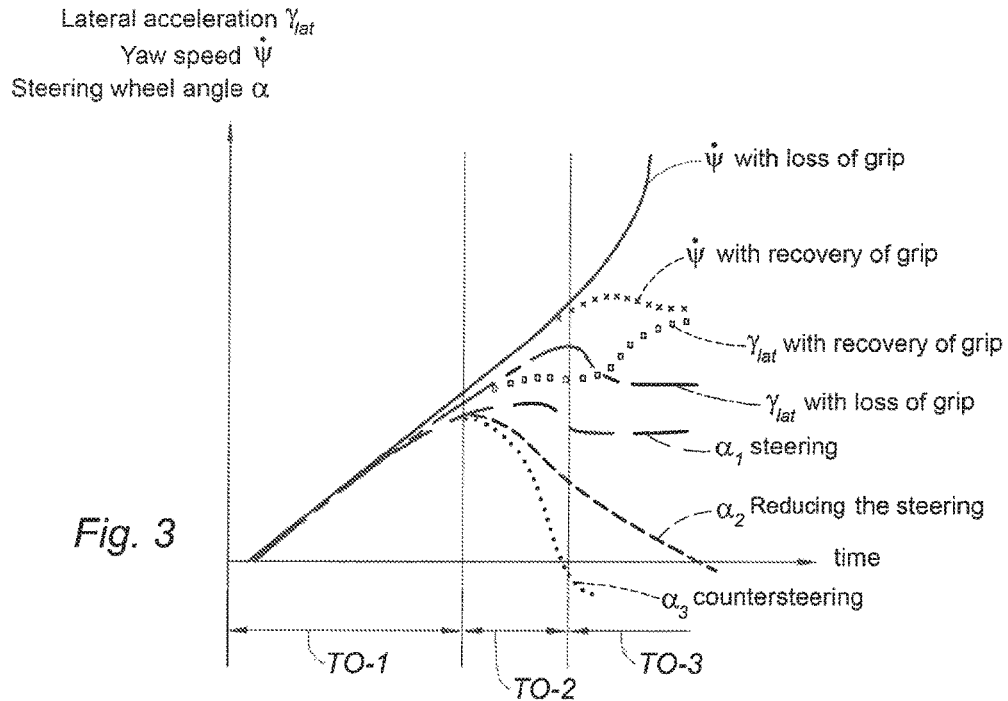
FIG. 3 illustrates, schematically, in a diagram similar to that of FIG. 2, the time evolution of the angular position of the steering wheel, of the yaw rate and of the lateral acceleration of the vehicle in an oversteer situation with loss of grip of the rear axle (swing-around).

With reference to FIGS. 2 and 3, it is indeed possible to schematically break up the course of an oversteer situation into three successive periods, namely:

Initially a first period TO-1 of normal behavior, where the yaw rate $\dot{\psi}$ (represented by a solid line in said FIGS. 2 and 3) increases in a manner substantially similar to the steering wheel angle α, which indicates that the vehicle faithfully responds to the steering movement (that is to say to the accentuation of the steering wheel angle) by engaging a turning move and normally holding said turning move, then a second period TO-2 of oversteer entry, during which the yaw rate $\dot{\psi}$ begins to increase further than the steering wheel angle α, which indicates that the vehicle tends to overreact to the steering maneuver, that is to say that said vehicle tends to rotate about itself (about its yaw axis) so as to adopt a turn path which is generally more curved than desired by the driver, then finally a third period TO-3 of loss of grip during which the yaw rate $\dot{\psi}$ increases rapidly by diverging from the steering wheel angle α, while, in this case the lateral acceleration $\gamma_{lat}$ continues to fall or holds at a relatively low value, which indicates a <<stall>> of the rear axle of the vehicle, the vehicle starting swinging-around.

Now, the crossing by the first indicator P1 (that is to say by the aforementioned partial derivative), of the oversteer threshold Threshold_OS_1 occurs precisely at the moment of the second period TO-2, and more particularly at the beginning of said second period, that is to say prior to any significant loss of grip, and while the vehicle is still controllable.

This coincidence therefore allows to detect (and to treat in an appropriate manner) very early the occurrence of a risk of oversteer.

Moreover, just as it was possible for the detection of an understeer situation, it will be possible, in order to arrive at a conclusion of the effective occurrence of an oversteer situation, to take into consideration, in addition to the criterion of comparison of the partial derivative P1 with the oversteer threshold Threshold_OS_1, one or more other complementary criterion/criteria, such as, for example, the value at the given instant of an understeer rate (respectively an oversteer rate) representative of the deviation between the actual angular position of the steering wheel and the theoretical angular position of the steering wheel, such that said theoretical angular position of the steering wheel should correspond to the dynamic situation of the vehicle (for example with regard to the measured speed of the wheels of said vehicle).

As previously indicated, such an understeer (or oversteer) rate can for example be calculated in the manner described in the international application WO-2010/070229 filed by the applicant.

For information purposes, it should be noted that, by simple convenience, FIGS. 2 and 3 have been established by considering that the absolute speed of the vehicle (that is to say the norm of the velocity vector of the center of gravity of the vehicle, expressed in the terrestrial reference frame) was constant during the described turning.

It should also be noted that, during the second period TO-2 of oversteer entry, the lateral acceleration $\gamma_{lat}$ of the vehicle, which corresponds here to the (relative) feeling of the centrifugal force in the reference frame attached to the vehicle, such that said centrifugal force would be sensed, for example, by an accelerometer which would be onboard the vehicle and which would measure the lateral acceleration component oriented in the transverse (left-right) direction of said vehicle, may decrease (relative to the yaw rate $\dot{\psi}$), despite the centrifugal (absolute) acceleration of the center of gravity of the vehicle, considered in the fixed terrestrial reference frame, increases, due to the phenomenon of drift (that is to say due to the phenomenon that an non-zero angle called <<attitude angle>> appears between the longitudinal direction of the vehicle and the direction of the absolute velocity vector of the center of gravity of said vehicle expressed in the terrestrial reference frame).

Moreover, it will be observed that the evolution (in time) of an oversteer situation can depend quite strongly on the evolution (in time) of the steering wheel angle $\alpha$, that is to say in practice on the reaction of the driver and/or, if any, the reaction of the automatic path stabilization system which acts on the steering system.

Indeed, if, in the oversteer entry situation TO-2, the driver maintains or accentuates his steering (that is to say increases the steering wheel angle $\alpha$ in the direction of the turn), as represented in FIGS. 2 and 3 by the scenario <<$\alpha1$>> corresponding to the steering wheel angle curves traced in long dashes, then the oversteer situation will tend to worsen and evolve towards a loss of grip (period TO-3 in FIG. 3), during which the yaw rate $\dot{\psi}$ increases rapidly while the lateral acceleration $\gamma_{lat}$ decreases.

If, in contrast, the driver <<reduces the steering>> (by returning the steering wheel towards the central position thereof), as illustrated by the scenario <<$\alpha2$>> corresponding to the curves in short dashes in FIGS. 2 and 3, or even if the driver countersteers (by turning the steering wheel beyond the central position, in the direction opposite to the path turn direction, so as to orient the wheels in the direction opposite to the directon of the path turn), as illustrated by the scenario <<$\alpha3$>> corresponding to the dotted curves in FIGS. 2 and 3, then it is possible that the vehicle regains grip, which allows to obtain a stabilization (rather than a worsening of the oversteer), that is to say a recovery of control of the vehicle.

Concretely, such stabilization results in a drop of the yaw rate $\dot{\psi}$ (which decreases progressively) while the lateral acceleration $\gamma_{lat}$ increases again, as illustrated at the end of the second period TO-2 of FIG. 2, and also shown as a watermark over the period TO-3 of FIG. 3 provided for the sake of visually comparing such a stabilization <<with recovery of grip>> with the opposite result <<with loss of grip>>.

Taking into consideration the significant incidence of the evolution of the steering wheel angle on the overall evolution of the behavior of the vehicle in an oversteer situation, it can be particularly useful to identify and distinguish these different oversteer scenarios, and/or to perceive the evolution of the vehicle between these different scenarios over time.

For this purpose, the method preferably comprises a step (d) of diagnosing an oversteer situation with a steering reduction (that is to say with <<reducing the steering>> OS-1, $\alpha2$, wherein said step (d) comprises comparing the value of the first indicator of loss of grip P1 with a predetermined second oversteer threshold Threshold_OS_2, calculating a second indicator of loss of grip P2 which corresponds to the partial derivative, relative to the lateral acceleration $\gamma_{lat}$ of the vehicle, of the driving parameter $\dot{\psi}$ representative of the yaw rate:

$$P2 = \frac{\partial \dot{\psi}}{\partial \gamma_{lat}},$$

and then comparing the value of this second indicator P2 with a third predetermined oversteer threshold Threshold_OS_3, and concluding that an oversteer situation with a steering reduction OS-1, $\alpha2$ takes place if, cumulatively, the value of the first indicator P1 is greater than the second oversteer threshold Threshold_OS_2, and the value of the second indicator P2 is greater than the third oversteer threshold Threshold_OS_3.

In other words, diagnosing an oversteer with reducing the steering requires that the two following conditions are satisfied simultaneously:

$$P1 = \frac{\partial \dot{\psi}}{\partial \alpha} > \text{Threshold\_OS\_2 and}$$

$$P2 = \frac{\partial \dot{\psi}}{\partial \gamma_{lat}} > \text{Threshold\_OS\_3}.$$

As described above for the first oversteer threshold, the second oversteer threshold Threshold_OS_2 and/or the third oversteer threshold Threshold_OS_3 can preferably be dynamically adjusted, substantially in real time, as a function of the speed of the vehicle and/or as a function of the steering wheel torque exerted by the driver on the steering wheel.

The lateral acceleration $\gamma_{lat}$ can be obtained by any appropriate means, and in particular may be measured by an accelerometer onboard the vehicle (and therefore attached to the reference frame of the vehicle), or provided by another on-board system of the vehicle (such as an anti-lock braking system ABS, for example), or even calculated from other dynamic parameters of the vehicle.

The partial derivative corresponding to the second indicator P2 can be calculated (substantially in real time) by performing the quotient, on the one hand, of the elementary variation of the driving parameter $\dot{\psi}$ between two close successive instants t1 and t2 (preferably separated by a duration which corresponds to the sampling period) and, on the other hand, of the corresponding elementary variation of the lateral acceleration $\gamma_{lat}$ of the vehicle between these two same instants t1 and t2.

Moreover, it should also be noted that, as a variant, as described with reference to the calculation of the first indicator P1, the theoretical steering wheel angle $\alpha_{theoretical}$ can also be used instead of the yaw rate $\dot{\psi}$, in order to calculate the second indicator P2 by derivation vis-à-vis the lateral acceleration $\gamma_{lat}$, that is to say $$P2 = \frac{\partial \alpha_{theoreticd}}{\partial \gamma_{lat}}$$

can be considered, and a comparison of this derivative value P2 with a second oversteer threshold (and respectively a third oversteer threshold) adapted accordingly, can be performed.

Moreover, in order to improve the accuracy of the diagnosis of the oversteer situations, the method preferably comprises a step (e) of diagnosing an oversteer situation with countersteering OS-2, $\alpha$3 comprising comparing the value of the first indicator of loss of grip P1 with a predetermined second oversteer threshold Threshold_OS_2 (the second threshold already mentioned above), calculating a second indicator of loss of grip P2 (the second indicator P2 already mentioned above) which corresponds to the partial derivative, relative to the lateral acceleration $\gamma_{lat}$ of the vehicle, of the driving parameter $\dot{\psi}$ representative of the yaw rate $\dot{\psi}$, then comparing the value of this second indicator P2 with a third predetermined oversteer threshold Threshold_OS_3 (the third threshold already mentioned above), and comparing the respective signs of the speed of rotation $\dot{\alpha}$ of the steering wheel and the yaw rate $\dot{\psi}$, and then concluding that an oversteer situation with a countersteering OS-2, $\alpha$3 takes place if, cumulatively, the value of the first indicator P1 is greater than the second oversteer threshold Threshold_OS_2, the value of the second indicator P2 is greater than the third oversteer threshold Threshold_OS_3, and the signs of the rotation speed $\dot{\alpha}$ of the steering wheel and of the yaw rate $\dot{\psi}$ are opposite.

In other words, diagnosing an oversteer with a countersteering requires that the three following conditions are satisfied simultaneously:

$$P1 = \frac{\partial \dot{\psi}}{\partial \alpha} > \text{Threshold\_OS\_2 and}$$

$$P2 = \frac{\partial \dot{\psi}}{\partial \gamma_{lat}} > \text{Threshold\_OS\_3 and}$$

$$\text{sign}(\dot{\alpha}) \rightarrow \leftarrow \text{sign}(\dot{\psi})$$

which is in practice tantamount to adding the condition of opposition of signs (sign($\dot{\alpha}$)→←sign($\dot{\psi}$)) to the two conditions that were used to identify an oversteer with reducing the steering during the step (d) mentioned above.

In the end, the method being preferably capable of implementing all the aforementioned diagnostic steps, said method will advantageously allow to operate accurately, depending on the number of fulfilled conditions, a selective identification of a situation of loss of grip among several predetermined situations, in particular including: an understeer situation (characterized by the conditions of the step (b)), oversteer situation with maintaining or accentuating the steering (characterized by the conditions of the step (c)), an oversteer situation with reducing the steering (characterized by the conditions of the step (d)), or finally an oversteer situation with a countersteering (characterized by the conditions of step (e)).

In other words, the method in accordance with the invention will allow detecting both understeer and oversteer situations, and even, where appropriate, distinguishing between several types (sub-categories) of oversteer situations.

Moreover, it should also be noted that, in order to complete the detection and the analysis of the oversteer situations, the method can also comprise a step (f) of diagnosing an oversteer situation with loss of grip (the vehicle tending to start swinging-around), as represented on the period TO-3 of FIG. 3.

Such an oversteer situation with loss of grip will for example be defined by simultaneously fulfilling the following three conditions:

$$\frac{\partial \dot{\psi}}{\partial t} > 0,$$

the yaw acceleration is strictly positive and $$\frac{\partial (\text{sliding\_rear\_wheels})}{\partial t} > 0,$$

the temporal derivative of the sliding of the rear wheels is positive, the sliding being equal to the ratio between, on the one hand, the difference between the longitudinal speed of the vehicle $V_{vehicle}$ and the speed $V_{wheel}$ of the periphery of the wheel, linked to the rotation $\omega$ of said wheel and, on the other hand, the longitudinal speed of the vehicle:

$$\text{sliding} = \frac{V\text{vehicle} - V\text{wheel}}{V\text{wheel}} = \frac{V\text{vehicle} - \text{Radius\_wheel} \cdot \omega\_\text{wheel}}{V\text{vehicle}}$$

and abs(torque_steeringwheel)<THRESHOLD_Torque, the absolute value of the torque, called <<steering wheel torque>>, exerted by the driver on the steering wheel is less than a predetermined torque threshold. Said steering wheel torque value can be typically measured by any suitable torque sensor, for example a magnetic sensor measuring the deformation of a torsion bar placed between the steering wheel and the steering column.

Moreover, the step (a) of calculating the first indicator P1 will be preferably inhibited if the variation $\partial \alpha$ of the variable $\alpha$ representative of the angular position of the steering wheel is zero (or substantially zero, that is to say, in absolute value, less than a predetermined low threshold close to zero) at the given instant.

This conditional inhibition constitutes a safety measurement which advantageously allows avoiding the occurrence, in the particular case where $\partial \alpha \approx 0$, of a divergence (discontinuity) in the calculation of the first indicator P1, by partial derivation.

According to a first possibility, this inhibition can result in suspending the refreshment of the calculation of the first indicator P1 at the given instant, and considereing that said indicator P1 may for example keep its latest value until a new refreshment is possible.

According to another possibility, the method can temporarily switch (while the variation $\partial \alpha$ is substantially zero) to an auxiliary method that makes it possible to evaluate by another process an oversteer or understeer situation, for example according to the method described in the international application WO-2010/070229 filed by the applicant, which proposes to determine an oversteer rate by calculating the ratio between a theoretical steering wheel angle, determined from the dynamics of the vehicle, and the actual steering wheel angle.

Whatever the form of the conditional inhibition, the low threshold used to decide on the triggering of such an inhibition, may be set during the development in factory or workshop, and may depend in particular on parameters specific to the vehicle and to the steering mechanism, such as the wheelbase, the scaling factor between the steering wheel and the steering rack, etc.

Moreover, preferably, the signal which corresponds to the variable α representative of the angular position of the steering wheel, the signal which corresponds to the first driving parameter $\dot{\psi}$ representative of the yaw rate, and/or the signal which corresponds to the first indicator P1 will be filtered, either temporally by means of a low-pass filter or by means of a validation filter which checks whether the concerned signal remains far less than a predetermined upper limit for a duration greater than a predetermined maintaining threshold (duration threshold) (that is to say that said validation filter ensures that said signal has been maintained continuously, for a duration at least equal to the maintaining threshold, under said upper limit, which corresponds to a maximum permissible threshold (or <<ceiling>>) so that said signal can be used in the calculations specific to the method).

In either case, the filtering has the effect of preventing the disturbances due to the rapid variations of the digital noise from distorting the calculation of the first indicator P1, or the exploitation of the value of said first indicator P1, for example by creating false positives which would be caused by temporary derivative peaks.

Of course, the invention also concerns a power steering system comprising a power steering mechanism controlled by a management module capable of implementing the method according to the invention.

The invention also concerns a motor vehicle, in particular with steered wheels, which are possibly also drive wheels, equipped with such a power steering system.

Finally, the invention also concerns as such a data medium readable by a computer and containing code elements of computer program ensuring the execution of a method according to any one of the characteristics described above when said medium is read by a computer.

Of course, the invention is in no way limited to the only embodiments described above, the person skilled in the art being in particular capable of freely isolating or combining together either of the aforementioned characteristics, or substituting them with equivalents.

The invention claimed is:

1. A method for detecting loss of grip of a vehicle provided with a steering system operated by a steering wheel, the method comprising:
    (a) calculating a first indicator of loss of grip (P1) which is a partial derivative $$\left(P1 = \frac{\partial \dot{\psi}}{\partial \alpha}\right)$$

of a driving parameter ($\dot{\psi}$) representative of yaw rate of the vehicle, relative to a variable (α) representative of angular position of the steering wheel;
    (b) detecting loss of grip of the vehicle based on the calculated first indicator of loss of grip (P1); and
    (c) controlling the vehicle based on the detected loss of grip.

2. The method according to claim 1, wherein the driving parameter ($\dot{\psi}$) is a measurement or an estimation of the yaw rate of the vehicle at a given instant or a theoretical angular position of the steering wheel ($\alpha_{theoretical}$) obtained from an angle of Ackermann ($\alpha_{Ackermann}$), which corresponds, in the absence of drift, to dynamic behavior of the vehicle observed at the given instant.

3. The method according to claim 1, further comprising:
    (d) comparing a value of the first indicator of loss of grip (P1) with an understeer threshold (Threshold_US);
    (e) detecting understeer if the value of the first indicator (P1) is less than the understeer threshold (Threshold_US); and
    (f) controlling the vehicle based on the detected understeer.

4. The method according to claim 1, further comprising:
    (d) comparing a value of the first indicator of loss of grip (P1) with a first oversteer threshold (Threshold_OS_1);
    (e) detecting oversteer if the value of the first indicator (P1) is greater than the first oversteer threshold (Threshold_OS_1); and
    (f) controlling the vehicle based on the detected oversteer.

5. The method according to claim 1, further comprising:
    (d) comparing the value of the first indicator of loss of grip (P1) with a second oversteer threshold (Threshold_OS_2);
    (e) calculating a second indicator of loss of grip (P2) which is a partial derivative $$\left(P2 = \frac{\partial \dot{\psi}}{\partial \gamma_{lat}}\right)$$

of the driving parameter ($\dot{\psi}$), relative to lateral acceleration ($\gamma_{lat}$) of the vehicle;
    (f) comparing a value of the second indicator (P2) with a third oversteer threshold (Threshold_OS_3);
    (g) detecting oversteer with steering reduction (OS-1, α2) if, cumulatively, the value of the first indicator is greater than the second oversteer threshold and the value of the second indicator is greater than the third oversteer threshold; and
    (h) controlling the vehicle based on the detected oversteer with steering reduction (OS-1, α2).

6. The method according to claim 1, further comprising:
    (d) comparing the value of the first indicator of loss of grip (P1) with a second oversteer threshold (Threshold_OS_2);
    (e) calculating a second indicator of loss of grip (P2) which is a partial derivative $$\left(P2 = \frac{\partial \dot{\psi}}{\partial \gamma_{lat}}\right)$$

of the driving parameter ($\dot{\psi}$) relative to lateral acceleration ($\gamma_{lat}$) of the vehicle;
    (f) comparing a value of the second indicator (P2) with a third oversteer threshold (Threshold_OS_3);
    (g) comparing respective signs of speed of rotation of the steering wheel ($\dot{\alpha}$) and the driving parameter ($\dot{\psi}$);

(h) detecting oversteer with countersteering (OS-2, α3) if, cumulatively, the value of the first indicator is greater than the second oversteer threshold, the value of the second indicator is greater than the third oversteer threshold, and the signs of the speed of rotation of the steering wheel and of the driving parameter ($\dot{\psi}$) are opposite; and (i) controlling the vehicle based on the detected oversteer with countersteering (OS-2, α3).

7. The method according to claim 1, wherein step (a) is inhibited while variation ($\partial\alpha$) of the variable ($\alpha$) is zero.

8. The method according to claim 1, wherein a signal which corresponds to the variable ($\alpha$), a signal which corresponds to the driving parameter ($\dot{\psi}$), or a signal which corresponds to the first indicator (P1), is filtered either temporally using a low-pass filter or using a validation filter which checks whether the signal remains less than an upper limit for a duration greater than a maintaining threshold.

9. The method according to claim 2, wherein the driving parameter ($\dot{\psi}$) is provided by an electronic path stabilization system (ESP).

\* \* \* \* \*